(12) United States Patent
Mendis et al.

(10) Patent No.: US 9,880,282 B1
(45) Date of Patent: Jan. 30, 2018

(54) DETERMINING DEVICE LOCATION USING MULTIPLE SOURCES OF LOCATION DATA

(75) Inventors: Indika Charles Mendis, Mountain View, CA (US); Philip Cheeran Verghese, Santa Clara, CA (US); Ana Maria Ulin Vazquez, Palo Alto, CA (US); Chris Lambert, San Francisco, CA (US)

(73) Assignee: Google LLC, Moutain View, CA (US)

( * ) Notice: Subject to any disclaimer, the term of this patent is extended or adjusted under 35 U.S.C. 154(b) by 1189 days.

(21) Appl. No.: 13/436,769

(22) Filed: Mar. 30, 2012

Related U.S. Application Data

(60) Provisional application No. 61/470,478, filed on Mar. 31, 2011.

(51) Int. Cl.
 *H04W 24/00* (2009.01)
 *G01S 19/05* (2010.01)
(52) U.S. Cl.
 CPC .................................. *G01S 19/05* (2013.01)
(58) Field of Classification Search
 CPC .................................. G01S 19/05; G01S 9/06
 See application file for complete search history.

(56) References Cited

U.S. PATENT DOCUMENTS

| | | | | |
|---|---|---|---|---|
| 8,519,844 | B2* | 8/2013 | Richey | H04W 4/023 340/539.1 |
| 2007/0077941 | A1* | 4/2007 | Gonia | G01S 1/66 455/456.1 |
| 2011/0294515 | A1* | 12/2011 | Chen et al. | 455/456.1 |
| 2012/0184287 | A1* | 7/2012 | Jovicic et al. | 455/456.1 |
| 2012/0308081 | A1* | 12/2012 | Sato | G01S 5/0252 382/103 |
| 2013/0196682 | A1* | 8/2013 | Kristoffersen | G01S 5/0236 455/456.1 |

FOREIGN PATENT DOCUMENTS

| | | | | |
|---|---|---|---|---|
| WO | WO 2010123418 A1 * | 10/2010 | | G01S 5/02 |

* cited by examiner

*Primary Examiner* — Joshua Schwartz
(74) *Attorney, Agent, or Firm* — Dority & Manning, PA

(57) ABSTRACT

Systems, methods, and machine-readable media for determining a location of a mobile device from different sources of location data is provided. The system may be configured to store current location data of a mobile device, the current location data associated with a first source of location data. The system may also be configured to obtain location data from a second source of location data, determine whether a first accuracy indicator of the current location data overlaps with a second accuracy indicator of the obtained location data from the second source, and update the current location data of the mobile device with the obtained location data from the second source if the first accuracy indicator of the current location data does not overlap with the second accuracy indicator of the obtained location data.

25 Claims, 8 Drawing Sheets

200
Current Location Record

205
Current Location Entry

| GPS | 5 Feet | 00:01:03 | [Location Data 1] |
|---|---|---|---|

210
Location Entries

| GPS | 5 Feet | 00:01:03 | [Location Data 1] |
|---|---|---|---|
| Wi-Fi | 50 Feet | 00:13:42 | [Location Data 2] |
| Cell Tower | 1 Mile | 00:03:19 | [Location Data 3] |
| ... | ... | ... | ... |

| # DETERMINING DEVICE LOCATION USING MULTIPLE SOURCES OF LOCATION DATA

RELATED APPLICATION

This application claims priority to U.S. provisional patent application 61/470,478, filed on Mar. 31, 2011, "SYSTEM AND METHOD FOR DETERMINING DEVICE LOCATION," the entire contents of which are herein incorporated by reference in its entirety.

BACKGROUND

The present disclosure generally relates to location based services and, in particular, determining the current location of a device.

The current location of a mobile device may be determined based on location data from various sources. For example, the mobile device may use a global positioning system (GPS), cell towers in a cellular network, WiFi access points, etc. to obtain location data to determine the location of the mobile device. The location data from these sources may have varying levels of accuracy. In addition, these sources may have varying levels of availability to the mobile device depending on the location of the mobile device, the movement of the mobile device, and/or the environment in which the mobile device and the sources are located.

A mobile device typically updates its current location based on the most recently received location data. However, the most recently received location data may be from a less accurate source than the current location data that it is replacing when, for example, the less accurate location data is the most recently received location data or when other more accurate sources of location data are unavailable (e.g., the signal for a location data source is too weak or not in range). As a result, the current location of the mobile device may be replaced using location data that is less accurate, even if the current location of the mobile device is still valid (e.g., if the mobile device has not moved a great deal or at all).

SUMMARY

According to one aspect of the subject technology, a system for determining a location of a mobile device from different sources of location data is provided. The system may include a location module, an interface module, and an update module. The location module may be configured to store current location data of a mobile device, the current location data associated with a first source of location data and a first accuracy indicator for the current location data. The interface module may be configured to obtain location data from a second source of location data, wherein the obtained location data is associated with a second accuracy indicator for the obtained location data. The update module may be configured to determine whether the first accuracy indicator for the current location data overlaps with the second accuracy indicator for the obtained location data and update the current location data of the mobile device with the obtained location data from the second source if the first accuracy indicator overlaps with the second accuracy indicator and if the second accuracy indicator is more accurate than the first accuracy indicator According to another aspect of the subject technology, a method for determining a location of a mobile device from different sources of location data is provided. The method may include storing current location data of a mobile device, the current location data associated with a first source of location data and a first accuracy indicator for the first source of location data, obtaining location data from a second source of location data, wherein the obtained location data is associated with a second accuracy indicator for the second source of location data, determining, using at least one processor, whether the obtained location data from the second source matches the stored current location data of the mobile device, and updating the current location data of the mobile device with the obtained location data from the second source if the obtained location data from the second source matches the stored current location data and if the second accuracy indicator for the second source is more accurate than the first accuracy indicator for the first source.

According to yet another aspect of the subject technology, a machine-readable medium including instructions stored therein, which when executed by a machine, cause the machine to perform operations for determining a location of a mobile device from different sources of location data is provided. The operations may include maintaining a location record configured to store current location data of a mobile device, the current location data associated with a first source of location data, obtaining location data from a second source of location data, determining, using at least one processor, whether the obtained location data from the second source matches the current location data of the mobile device, and updating the current location data of the mobile device in the location record with the obtained location data if the obtained location data does not match the current location data.

Another aspect of the subject technology relates to a system for determining a location of a mobile device from different sources of location data. The system may include one or more processors and a machine-readable medium comprising instructions stored therein, which when executed by the one or more processors, cause the one or more processors to perform operations. The operations may include storing current location data of a mobile device, the current location data associated with a first source of location data and a first accuracy indicator for the current location data, obtaining location data from a second source of location data, wherein the obtained location data is associated with a second accuracy indicator for the obtained location data, determining, using at least one processor, whether the first accuracy indicator for the current location data overlaps with the second accuracy indicator for the obtained location data, and updating the current location data of the mobile device with the obtained location data from the second source if the first accuracy indicator does not overlap with the second accuracy indicator.

Another aspect of the subject technology relates to a method for determining a location of a mobile device from different sources of location data. The method may include storing current location data of a mobile device, the current location data associated with a first source of location data and a first accuracy indicator for the current location data, obtaining location data from a second source of location data, wherein the obtained location data is associated with a second accuracy indicator for the obtained location data, determining, using at least one processor, whether the first accuracy indicator for the current location data overlaps with the second accuracy indicator for the obtained location data, and updating the current location data of the mobile device with the obtained location data from the second source if the first accuracy indicator does not overlap with the second accuracy indicator.

Another aspect of the subject technology relates to a machine-readable medium that includes instructions stored therein, which when executed by a machine, cause the machine to perform operations. The operations may include storing current location data of a mobile device, the current location data associated with a first source of location data and a first accuracy indicator for the current location data, obtaining location data from a second source of location data, wherein the obtained location data is associated with a second accuracy indicator for the obtained location data, determining, using at least one processor, whether the first accuracy indicator for the current location data overlaps with the second accuracy indicator for the obtained location data, and updating the current location data of the mobile device with the obtained location data from the second source if the first accuracy indicator does not overlap with the second accuracy indicator.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
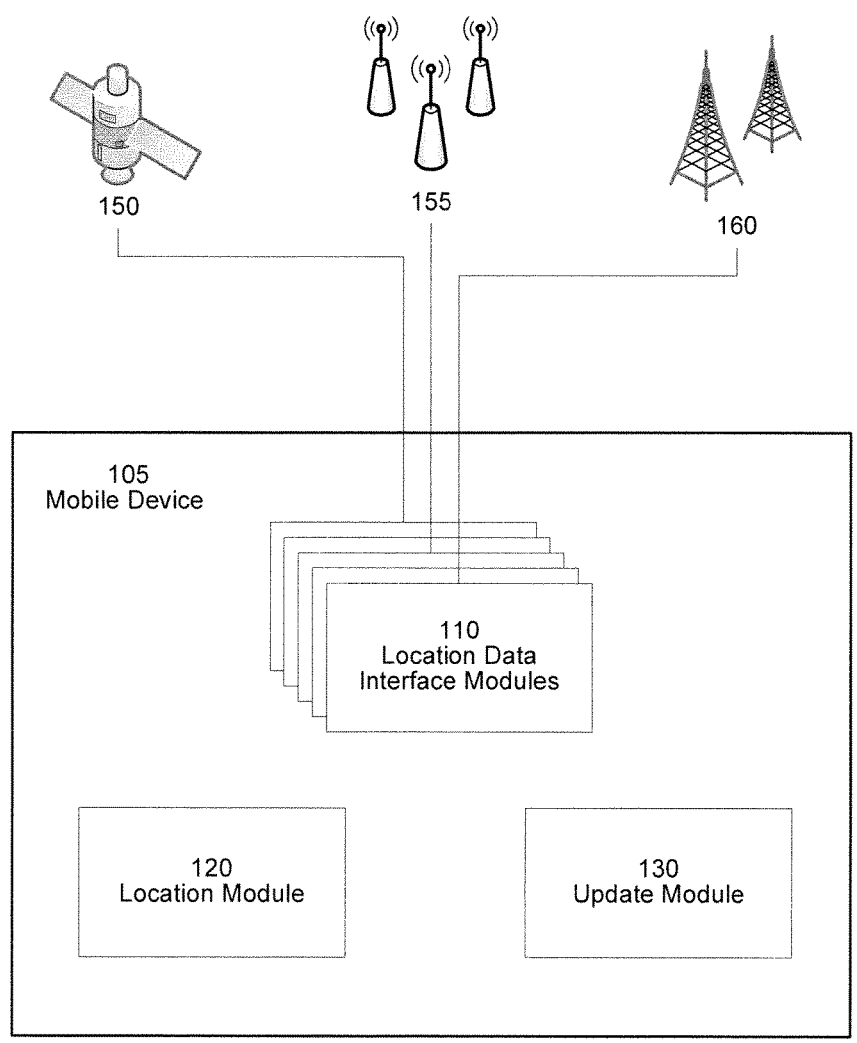
FIG. 1 is a conceptual block diagram illustrating an environment for determining a location of a mobile device based on location data from various sources in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, methods and systems for determining a current location of a mobile device using several different types of sources of location data are provided. The system may keep track of the location of a mobile device by maintaining a record containing current location data corresponding to the location of the mobile device.

The system may, from time to time, receive new location data from one or more of the sources of location data. For example, different sources of location data may be polled periodically at different rates or different sources of location data may not be available under certain conditions (e.g., the signal for a location data source is too weak or the interface that communicates with a location data source may be disabled).

In order to decide whether to update the current location data of the mobile device with the subsequently received (e.g., new) location data, the system may determine whether the mobile device has moved based on the current location data and the new location data. If it is determined that the mobile device has moved, the system will update the current location data with the new location data. If the mobile device has not moved, the system will not update the current location data unless the new location data is more accurate than the current location of the mobile device. The system may identify which location data is more accurate based on an accuracy indicator associated with the location data. The accuracy indicator associated with the location data may be obtained from the source of the location data or determined based on the type of location data (e.g., GPS location data, location data from cell tower id, location data from WiFi hotspots, etc.).

As a result, the most accurate valid location data may be used as the current location data (e.g., from WiFi hotspots) for the mobile device. For example, if the mobile device has not moved, the system will keep a more accurate current location data rather than update it with subsequently received new location data from a less accurate source (e.g., from cell tower ids). If the mobile device has not moved but the new location data is from a more accurate source than the current location data for the mobile device, then the system may use the new, more accurate location data (e.g., GPS location coordinates) as the current location data. If, on the other hand, the system detects that the mobile device has moved, the system may update the current location data for the mobile device with the new location data regardless of whether it is more accurate than the current location data because the current location data is no longer valid. Further details of the system are described below with respect to FIG. 1.

FIG. 1 is a conceptual block diagram illustrating an environment 100 for determining a location of a mobile device 105 based on location data from various sources in accordance with various aspects of the subject technology. The mobile device 105 may be any machine or computing device able to receive location data (e.g., location coordinates) from one or more sources. For example, mobile device 105 may be a laptop, a smart phone, tablet computer, personal digital assistant (PDA), a global positioning system (GPS) device, or any other machine with a processor, memory, and communications capabilities.

According to one aspect, the mobile device 105 may include one or more location data interface modules 110, a location module 120, and an update module 130. The location module 120 may be configured to keep track of the current location of the mobile device. For example, the location module 120 may store a current location record or other data structure that includes an entry containing current location data for the mobile device. The current location record may also include entries containing location data from other sources of data.

Figure 2:
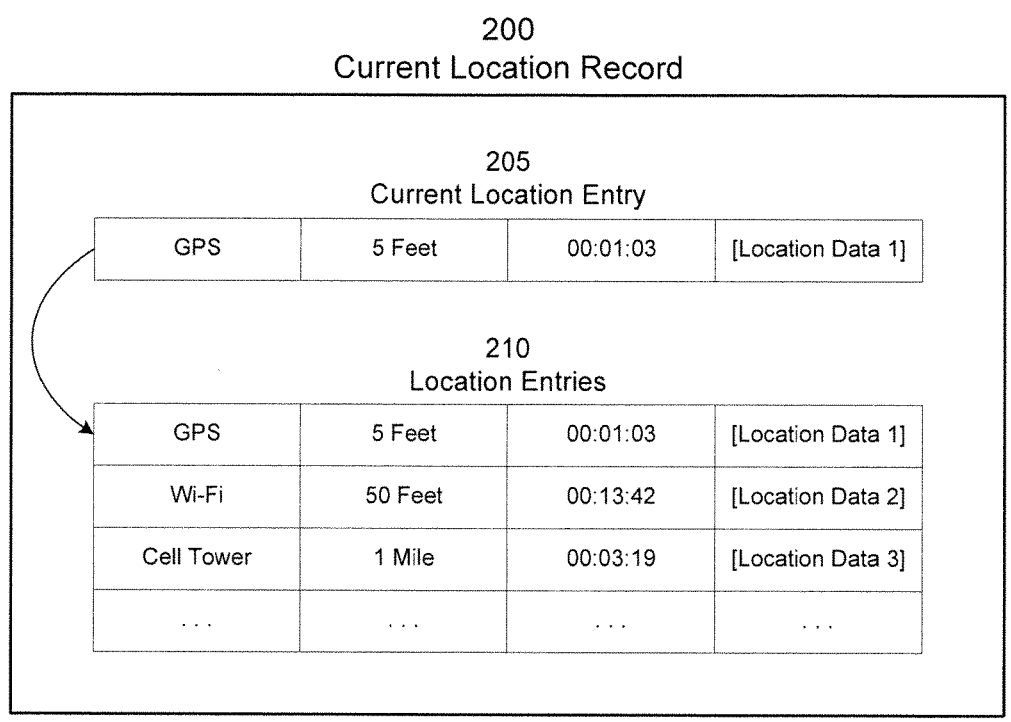
FIG. 2 is a conceptual representation of a current location record according to various aspects of the subject technology.

FIG. 2 is a conceptual representation of a current location record 200 according to various aspects of the subject technology. The current location record 200 may include a number of location entries 210 where each entry contains, for example, a description of the source (e.g., a name or source type), an accuracy indicator representing how accurate the location data is, a timestamp for when the location data was received, and the location data (e.g., location coordinates). As discussed above, the current location record 200 may also keep track of an entry containing the current location data 205 for the mobile device. The current location entry 205 may be separate from the other location entries 210 or, in some aspects, reference one of the location entries 210.

The one or more location interface modules 110 may be configured to interact with the various sources of location data and obtain location data from the sources. The location data obtained from the sources may then be stored in one of the location entries 210 of the current location record 200. If an entry already contains previously obtained location data for the same source type, the location entry for that source type may be updated with the recently obtained location data. For example, if the location interface modules 110 receive GPS location coordinates, and there is a previous entry for GPS location data, the location module 120 may replace the entry for GPS location data with the received location coordinates. In some aspects, a location entry may also be removed from the current location record 200 if the location source for that location entry is no longer available (e.g., no longer in communication with the mobile device).

Referring back to FIG. 1, in some aspects, a location interface module 110 in the form of a GPS sensor may be configure to communicate with a GPS service or satellite 150 in order to retrieve GPS location data (e.g., GPS coordinates). A Wi-Fi interface may be configured to detect one or more Wi-Fi networks 155 and retrieve location data based on the Wi-Fi networks (e.g., access points) detected. For example, one or more detected Wi-Fi networks 155 may be associated with location data stored on the Wi-Fi network itself, at the mobile device 105, or on a database or server in communication with the mobile device.

In another aspect, a location data interface module 110 may be a cellular network interface configured to communicate with one or more cell towers 160 within range of the device and determine location data based on the locations of the cell towers. For example, the cellular network interface may identify the cell tower ID of a detected cell tower and use the cell tower ID to determine the location of the cell tower by.

Although FIG. 1, in the interest of clarity, only shows 3 sources of location data to describe aspects of the subject technology, other types of location interface modules 110 may be configured to obtain location from other sources of location data and use other techniques to calculate location data may be used. For example a Bluetooth interface may detect other Bluetooth enabled devices that are associated with a location and use the detected Bluetooth enabled devices to calculate location data for the mobile device. Other communicating devices may also be detected in a similar fashion and used to calculate location data. Other location data interface modules may generate accelerometer data, barometer data, etc. that may be used to infer and calculate location data.

Although the interface modules 110 may obtain location data from several different sources, the obtained location data may not be of the same quality. In many cases, the accuracy of the obtained location data varies based on the source of the location data. For example, the GPS location data obtained using a GPS interface may be accurate to within a few feet while Wi-Fi location data may be accurate to within roughly 50 to 100 feet and cell tower location data may be accurate to within as much 2 kilometers or more.

Each source of data may be associated with an accuracy indicator representing how accurate the location data may be. The accuracy indicator may be obtained from source of the location data, the mobile device, or a server in communication with the mobile device. Each accuracy indicator can be conceptually represented as a circle with a predetermined radius around the coordinates of the location data with a smaller radius representing a more accurate source.

Figure 3:
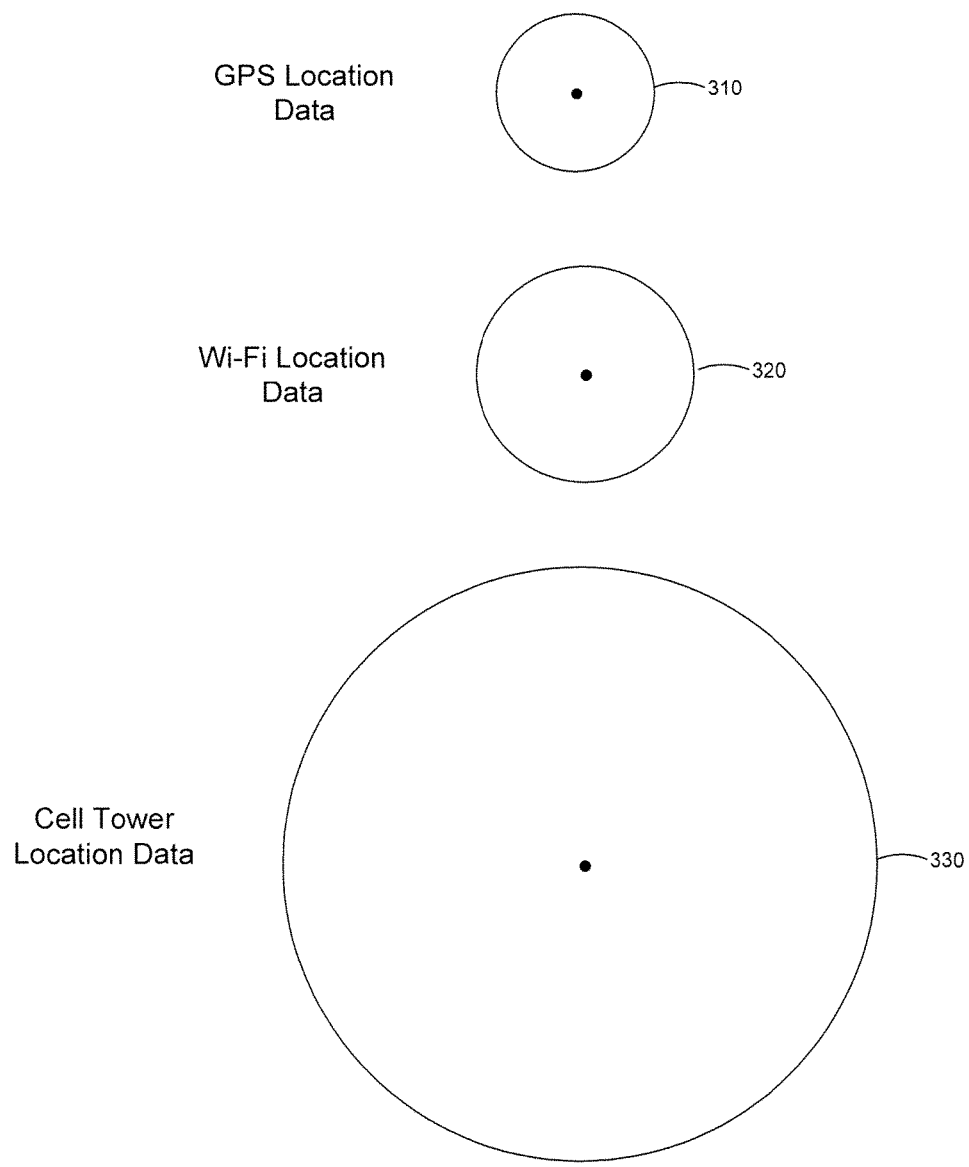
FIG. 3 is a conceptual diagram illustrating accuracy indicators for various sources of location data.

FIG. 3 is a conceptual diagram illustrating accuracy indicators for various sources of location data. The accuracy of GPS location data may be represented by an accuracy indicator 310 of about 5 feet. The accuracy of Wi-Fi location data may be represented by an accuracy indicator 320 of about 50 feet and the accuracy of cell tower location data may be represented by an accuracy indicator 330 of 1 mile.

Referring back to FIG. 1, the update module 130 may be configured to determine whether to update the current location entry 205 in the location record 200 with the location data obtained by one of the interface modules 110 from a location data source. According to some aspects, the decision on whether to update the current location entry 205 is made based on whether the received location data is more accurate than the location data in the current location entry 205 and whether the update module 130 has detected that the mobile device 105 has moved. As will be discussed further below with reference to FIG. 4-FIG. 6, the update module 130 may detect that the mobile device 105 has moved based on the distance between the obtained location data and the current location data in the current location entry 205 and the accuracy indicators associated with the obtained location data and the current location data in the current location entry 205.

Figure 4:
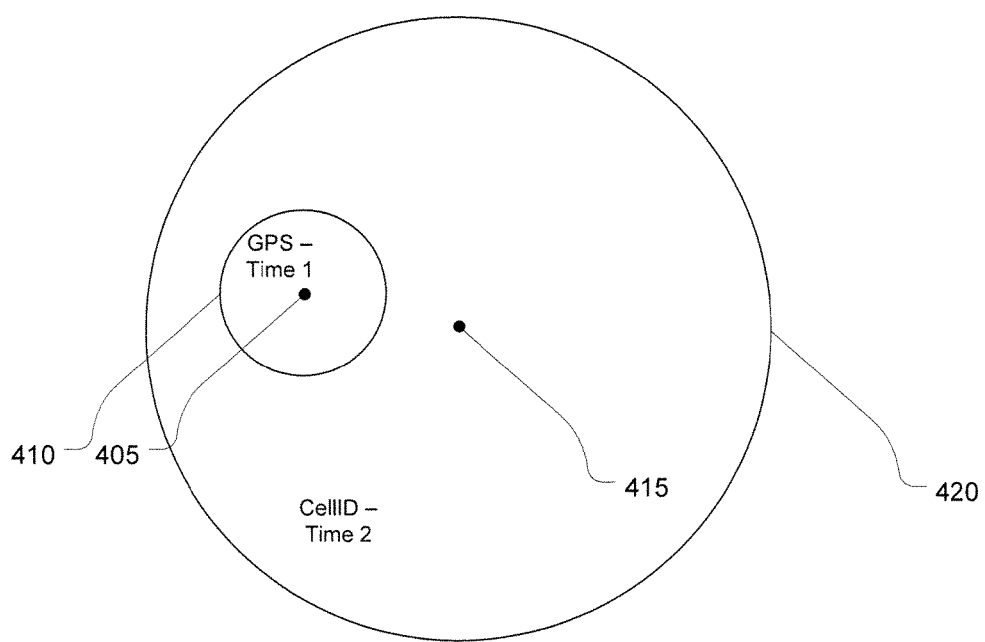
FIG. 4 is a conceptual diagram illustrating current location data and subsequently obtained location data in accordance with one aspect of the subject technology.

FIG. 4 is a conceptual diagram illustrating current location data 405 and subsequently obtained location data 415 in accordance with one aspect of the subject technology. In FIG. 4, the current location data 405 was received at a first moment in time (e.g., Time 1) and is associated with a GPS. The subsequently obtained location data 415 was received at a second moment in time (e.g., Time 2) after the first moment in time and is associated with a less accurate cellular tower ID source. Such a situation may arise if, for example, the source for GPS data (e.g., a GPS satellite) is unreachable for a period of time or if location data from the cellular tower ID has just been obtained.

The current location data 405 is associated with an accuracy indicator 410 that represents the accuracy of the current location data 405 (e.g., the actual location of the mobile device, given the current location data 405, is most likely within the area indicated by the accuracy indicator 410). Similarly, the obtained location data 415 is associated with an accuracy indicator 420 that represents the accuracy of the obtained location data 415.

If the more recently obtained more recently obtained location data 415 was more accurate than the current location data 405 or equally accurate, the update module 130 may have updated the current location data 405 with the obtained location data 415. However, because the more recently obtained location data 415 is less accurate than the current location data 405, the update module 130 will only update the current location data 405 if the update module 130 determines that mobile device has moved from the time the current location data 405 was received (Time 1) to the time the subsequently obtained location data 415 was received (Time 2).

The update module 130 may determine if the mobile device has moved from Time 1 to Time 2 using the accuracy indicator 420 associated with the obtained location data 415. For example, as can be seen in FIG. 4, the current location data 405 and the accuracy indicator 410 of the current location data 405 may be found within the accuracy indicator 420 associated with the obtained location data 415 (e.g., the current location data 405 and the accuracy indicator 410 of the current location data 405 intersect with the area indicated by the accuracy indicator 420 associated with the obtained location data 415). As a result, the current location data 405 matches or is compatible with subsequently obtained location data 415. In other words, the current location data 405 is still valid and there is no need to update the current location data 405 with the subsequently obtained location data 415 since the current location data 405 is more accurate.

As a result, the update module 130 will not update the current location data 405. In some aspects, although the update module 130 does not update the current location data 405, the update module 130 may update the timestamp for the current location data 405 the time the subsequently obtained location data 415 was received. By doing so, the timestamp for the current location data 405 may reflect the most recent time that the current location data 405 was still valid.

Figure 5:
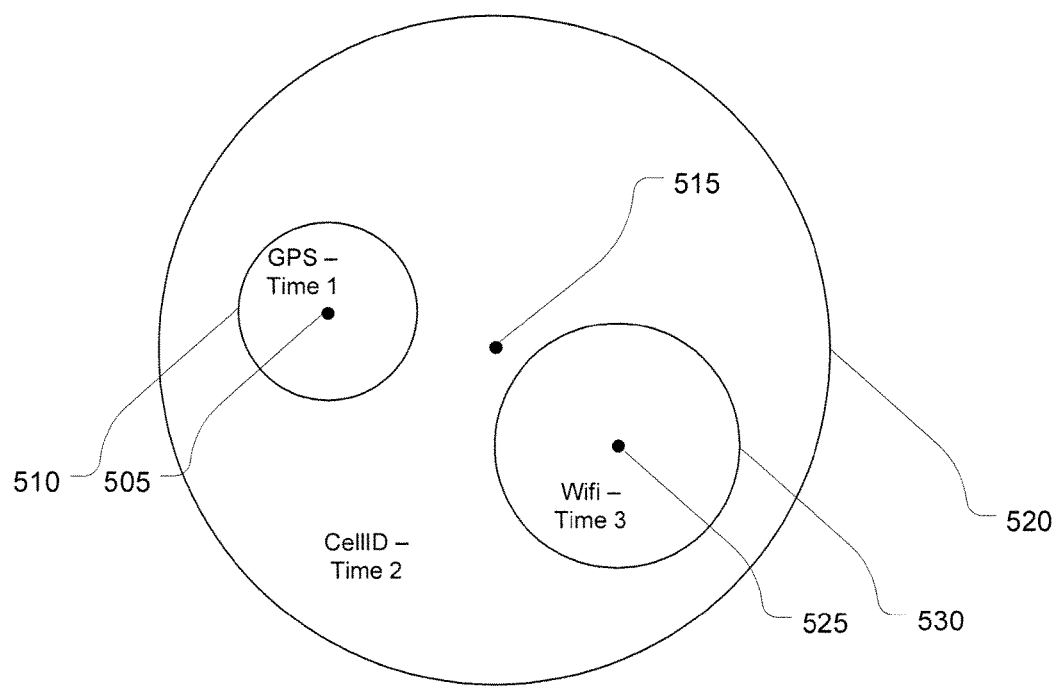
FIG. 5 is a conceptual diagram illustrating current location data and two subsequently obtained sets of location data in accordance with one aspect of the subject technology.

If, on the other hand, the update module 130 determines that the mobile device has moved (e.g., the current location data is no longer valid), the update module 130 will update the current location data with subsequently obtained location data. For example, FIG. 5 is a conceptual diagram illustrating current location data 505 and two subsequently obtained sets of location data 515 and 525 in accordance with one aspect of the subject technology. In a situation similar to the one illustrated in FIG. 4, in FIG. 5 the current location data 505 was received from a GPS location source obtained at a first moment in time (e.g., Time 1). The subsequently obtained location data 515 (e.g., Cell Tower location data) was calculated using one or more cell tower IDs at a second moment of time after Time 1 (e.g., Time 2). As discussed above, however, the current location data 505 is not updated at Time 2 after receiving the subsequently obtained location data 515 because the current location data 505 is more accurate and is still valid.

FIG. 5, further illustrates another obtained location data 525 (e.g., Wi-Fi location data) that is calculated based on one or more detected Wi-Fi networks. The obtained location data 525 was obtained at a third moment of time (e.g., Time 3) after Time 2. In this situation, the update module 130 may determine that the current location data 505 (still based on GPS location data obtained at Time 1) and the Wi-Fi location data 525 obtained at Time 3 are do not match because the accuracy indicator 530 associated with the Wi-Fi location data 525 does not overlap with the current location data 505 or its associated accuracy indicator 510.

The current location data 505 being incompatible with the Wi-Fi location data 525 indicates that the current location data 505 may no longer be valid (e.g., the mobile device has moved to the area indicated by the accuracy indicator 530 associated with Wi-Fi location data 525). As a result, the update module 130 may update the current location data 505 using the Wi-Fi location data 525 obtained at Time 3 since the Wi-Fi location data 525 is the most accurate source of location data available to the mobile device at Time 3. A similar result would occur if both the Cell Tower location data 515 and the Wi-Fi location data 525 were obtained at Time 2.

Figure 6:
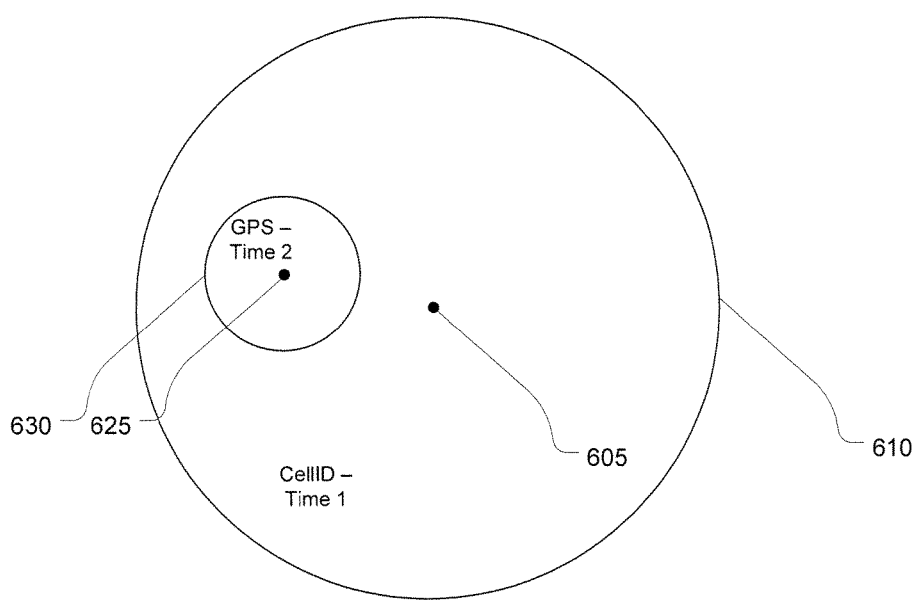
FIG. 6 is a conceptual diagram illustrating current location data and subsequently obtained of location data in accordance with one aspect of the subject technology.

Even if the update module 130 does not detect that the mobile device has moved since the current location data was received, the update module 130 may update the current location data if subsequently received location data is more accurate than the current location data. For example, FIG. 6 is a conceptual diagram illustrating current location data 605 and subsequently obtained of location data 635 in accordance with one aspect of the subject technology. In FIG. 6, the current location data 605 (e.g., Cell Tower location data) may be calculated using one or more cell tower IDs obtained at a first moment in time (i.e., Time 1). Subsequently obtained location data 625 (GPS location data) may be obtained from a GPS service at a second moment of time after Time 1 (i.e., Time 2). Both the current location data 605 and the subsequently obtained location data 625 may each be associated with an accuracy indicator (e.g., accuracy indicators 610 and 630).

The update module 130 may determine that the current location data 605 is still valid because the subsequently obtained location data 625 is compatible with the current location data 605 (e.g., the accuracy indicator 610 associated with current location data 605 intersects with the subsequently obtained location data 625. However, the current location data 605 is less accurate than the subsequently obtained location data 625. This is conceptually illustrated by the accuracy indicator 610 associated with the current location data 605 being larger (e.g., less accurate) compared to the accuracy indicator 630 associated with the subsequently obtained location data 625. As a result, according to one aspect, the update module 130 may update the current location data 605 based on the more accurate subsequently obtained location data 625.

Figure 7:
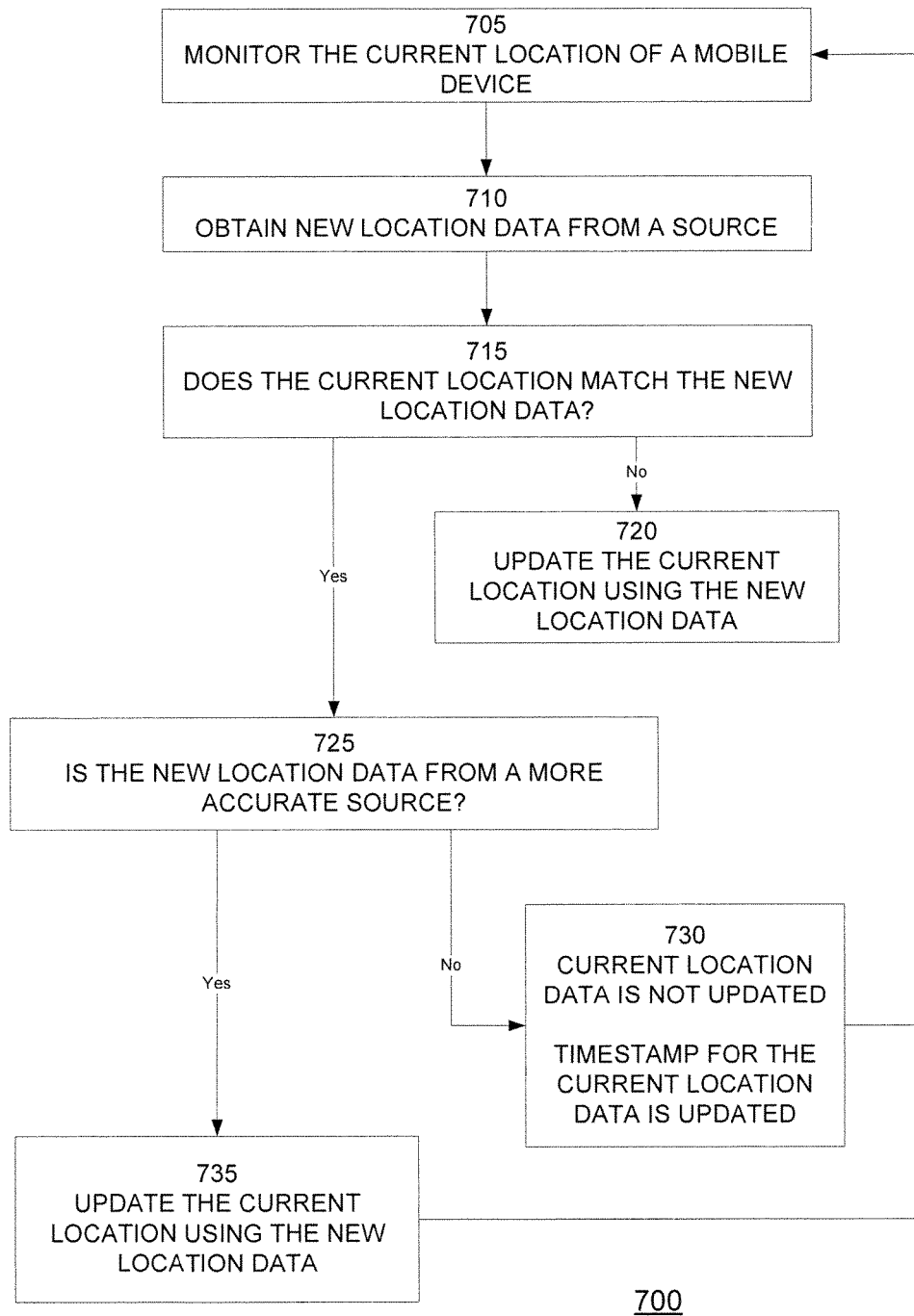
FIG. 7 is a flow chart illustrating a process for determining the location of a mobile device based on location data from various sources, in accordance with one aspect of the subject technology.

FIG. 7 is a flow chart illustrating a process 700 for determining the location of a mobile device based on location data from various sources, in accordance with one aspect of the subject technology. Although the operations in process 700 are shown and described in a particular order, certain operations may be performed in different orders or at the same time. The process begins at operation 705 where a location module 120 monitors the current location of a mobile device. For example, the location module 120 may maintain a current location record 200 (see FIG. 2) that includes a current location entry 205 that tracks the current location data for the mobile device.

In some aspects, the current location record 200 may also include a number of location entries 210 that may be stored with location data received from various sources of location data. For example, the location data interface modules 110 may poll one or location sources in order to obtain location data. According to one aspect, the polling may occur at periodic cycles. The location module 120 may store the obtained location data in the location entries 210 in the current location record 200 along with a timestamp referring to when the location data was received, an accuracy indicator associated with the source of the location data, and a source description, type, or identifier. In some aspects, if the location entries 210 already include an entry for the source for the obtained location data, the entry for the source may be updated with the obtained location data and timestamp instead of creating a new entry for the obtained location data.

At operation 710, the location data interface modules 110 may request and receive new location data from one or more sources. Once received, the location module 120 may determine whether the mobile device has moved by determining whether the current location data matches or is compatible with the new location data at operation 715. In one aspect described above, the current location matches the new location data if the accuracy indicator of the current location overlaps with the accuracy indicator of the new location data.

If the current location and the new location data do not match, the current location data may no longer be valid and, at operation 720, the update module 130 may update the current location data using the newly obtained location data. If the current location data and the new location data match, the current location data may still be valid. However, it may still be desirable to update the current location data if more the new location data is more accurate.

At operation 725, the location module 120 may determine whether the new location data is associated with a more accurate source than the current location. According to one aspect, this may be done by comparing the accuracy indicator of the new location data with the accuracy indicator of the current location. If the new location data is not more accurate, at operation 730, no update is performed to the current location data. In some aspects, however, the timestamp for the current location data may be updated using the time the new location data was received. If, on the other hand, the new location data is more accurate, at operation 735, the update module 130 may update the current location using the new location data.

As discussed above, the polling may occur at periodic cycles. These cycles may be at random or according to a predetermined schedule. The schedule may, for example, be based on the amount of resources (e.g., battery power) required to poll a source. According to some aspects, the location data interface modules 110 may poll locations sources requiring the least amount of power to preserve the battery in the mobile device. In other aspects, the frequency that one or more of the location sources are polled may be depend on whether the movement of the mobile device is detected. For example, the mobile device may request location data from available sources more frequently when movement is detected than when the mobile device is stationary.

In some aspects, certain quality control measures may be taken in order to improve the quality of current location results. For example, if the current location of a mobile device is in one location (e.g., Mountain View, Calif.) and mobile device receives location data that corresponds to another location (e.g., Boston, Mass.) that is over a threshold distance from the current location, the system may discard the update module 130 may ignore or discard the new location data because it is unlikely that the mobile device would have traveled from the current location to the new location in the time between the timestamp for the current location and the timestamp for the new location.

In some aspects, regardless of how location data is obtained, appropriate efforts may also be taken to protect user privacy rights. For example, collection of location data may be on an opt-in basis so that data is not collected unless the user has granted permission, with the location data stored and handled in a secure manner. Additionally, steps can be taken to anonymize the location data (e.g., to ensure that the location data cannot be tied to a particular user and/or to a particular device).

The location monitoring by the mobile device may be based on user permission/authorization. In the absence of permission/authorization set by a user of the mobile device, the mobile device may maintain only the current location record containing elements corresponding to the location sources available at the last update or may disable the location determination functionality altogether. A user may authorize the mobile device, and any services or applications running on the mobile device, to store one or more previous location records to track previous movement of the mobile device.

Figure 8:
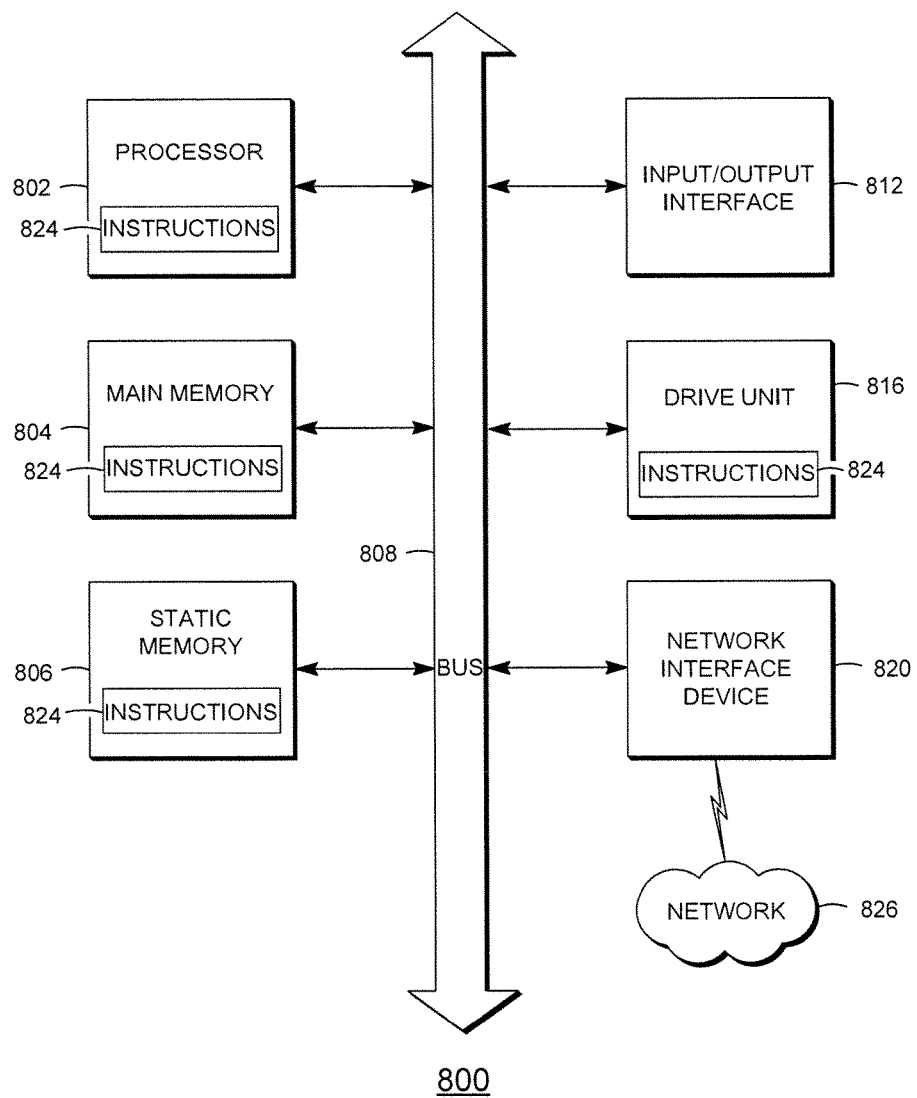
FIG. 8 is a block diagram illustrating a computer system with which the mobile device of FIG. 1 may be implemented, according to one aspect.

FIG. 8 is a block diagram illustrating a computer system with which the mobile device of FIG. 1 may be implemented, according to one aspect. In certain aspects, the computer system 800 may be implemented using hardware or a combination of software and hardware, either in a dedicated server, or integrated into another entity, or distributed across multiple entities.

The example computer system 800 includes a processor 802, a main memory 804, a static memory 806, a disk drive unit 816, and a network interface device 820 which communicate with each other via a bus 808. The computer system 800 may further include an input/output interface 812 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 802 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 824 embodying any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media. The instructions 824 may further be transmitted or received over a network 826 via the network interface device 820.

The machine-readable medium may be a single medium or multiple media (e.g., a centralized or distributed database, and/or associated caches and servers) that store the one or more sets of instructions. The machine-readable medium may comprise the drive unit 816, the static memory 806, the main memory 804, the processor 802, an external memory connected to the input/output interface 812, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for determining a location of a mobile device from different sources of location data is provided. The system may include a location module, an interface module, and an update module. The location module may be configured to monitor a current location of a mobile device, the current location associated with a first source of location data. The interface module may be configured to obtain location data from a second source of location data. The update module may be configured to determine whether a first accuracy indicator of the current location intersects with a second accuracy indicator of the obtained location data and update the current location of the mobile device with the obtained location data if the first accuracy indicator of the current location does not intersect with the second accuracy indicator of the obtained location data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

What is claimed is:

1. A method for determining a location of a mobile device from different sources of location data, the method comprising:

obtaining, with one or more computing devices, current location data of a mobile device, wherein the current location data is associated with a first source of location data, a first time, and a first accuracy indicator for the first source of location data;

obtaining, with the one or more computing devices, location data from a second source of location data, wherein the location data from the second source is associated with a second accuracy indicator for the second source of location data and a second time;

determining, with the one or more computing devices, whether the mobile device has moved from the first time to the second time based at least in part on the first accuracy indicator and the second accuracy indicator;

comparing, with the one or more computing devices, the first accuracy indicator and the second accuracy indicator to determine whether the location data from the second source of location data is less accurate than the current location data associated with the first source; and updating, with the one or more computing devices, the current location data of the mobile device with the obtained location data from the second source if the mobile device has moved from the first time to the second time or if the location data from the second source of location data is not less accurate than the current location data associated with the first source.

2. The method of claim 1, wherein the first accuracy indicator comprises a first circle with a first radius around first coordinates of the current location data of the mobile device and the second accuracy indicator comprises a second circle with a second radius around second coordinates of the location data of the second source.

3. The method of claim 2, wherein the first radius is smaller than the second radius, and wherein the method further comprises:

determining that the second accuracy indicator is less accurate than the first accuracy indicator.

4. The method of claim 1, wherein determining, with the one or more computing devices, whether the mobile device has moved from the first time to the second time based at least in part on the first accuracy indicator and the second accuracy indicator comprises:
determining whether the first accuracy indicator centered at the current location data overlaps with the second accuracy indicator centered at the obtained location data from the second source.

5. The method of claim 1, further comprising:
persisting the current location data of the mobile device if it is determined that the mobile device has not moved from the first time to the second time and the second source is less accurate than the first source.

6. The method of claim 1, further comprising:
maintaining a current location record configured to store the current location data of the mobile device, wherein the current location record comprises a plurality of location entries configured to store location data from a plurality of sources, and wherein each location entry of the plurality of location entries is configured to store location data from one source of the plurality of sources, the location entry containing a source type, an accuracy indicator of the source, the location data from the source, and a timestamp for the location data.

7. The method of claim 6, wherein the current location data is stored in the current location record with a timestamp associated with the current location data, and wherein the method further comprises:
updating, with the one or more computing devices, the timestamp associated with the current location data if it is determined that the mobile device has not moved from the first time to the second time and that the location data from the second source of location data is less accurate than the current location data associated with the first source, wherein the updated timestamp is indicative of the second time.

8. A system for determining a location of a mobile device from different sources of location data, the system comprising:
one or more processors; and
a machine-readable medium comprising instructions stored therein, which when executed by the one or more processors, cause the one or more processors to perform operations comprising:
storing current location data of a mobile device, wherein the current location data is associated with a first source of location data, a first accuracy indicator for the first source of location data, and a first time;
obtaining location data from a second source of location data, wherein the location data from the second source is associated with a second accuracy indicator for the second source of location data and a second time;
determining whether the mobile device has moved from the first time to the second time based at least in part on the first accuracy indicator and the second accuracy indicator;
determining whether the location data from the second source of location data is less accurate than the current location data associated with the first source based at least in part on the first accuracy indicator and the second accuracy indicator; and
updating the current location data of the mobile device with the obtained location data from the second source if the mobile device has moved from the first time to the second time or if the location data from the second source of location data is not less accurate than the current location data associated with the first source.

9. The system of claim 8, wherein updating the current location data of the mobile device comprises:
updating the current location data of the mobile device with the obtained location data from the second source if the first accuracy indicator of the current location data does not overlap with the second accuracy indicator of the obtained location data.

10. The system of claim 8, wherein the first accuracy indicator comprises a first circle with a first radius around first coordinates of the current location data associated with the first source and the second accuracy indicator comprises a second circle with a second radius around second coordinates of location data from the second source.

11. The system of claim 10, wherein determining whether the mobile device has moved from the first time to the second time based at least in part on the first accuracy indicator and the second accuracy indicator comprises:
determining whether the first circle overlaps with the second circle.

12. The system of claim 11, wherein updating the current location data of the mobile device comprises:
updating the current location data of the mobile device with the obtained location data from the second source if the first circle does not overlap with the second circle.

13. The system of claim 8, wherein the current location data of the mobile device is stored in a current location record with a timestamp.

14. The system of claim 13, wherein updating the current location data of the mobile device with the obtained location data from the second source comprises:
updating the current location record if the mobile device has moved from the first time to the second time or if the location data from the second source of location data is not less accurate than the current location data associated with the first source.

15. A non-transitory machine-readable medium comprising instructions stored therein, which when executed by a machine, cause the machine to perform operations comprising:
maintaining a location record configured to store current location data of a mobile device, the current location data associated with a first source of location data, a first accuracy indicator, and a first time;
obtaining location data from a second source of location data, wherein the location data from the second source is associated with a second accuracy indicator and a second time;
determining whether the mobile device has moved between the first time and the second time based at least in part on the first and second accuracy indicators;
determining whether the second source of location data is less accurate than the first source of location data based at least in part on the first and second accuracy indicators; and
updating the current location data of the mobile device in the location record with the obtained location data if it is determined that the location data has moved and if the second source is not less accurate than the first source.

16. The machine-readable medium of claim 15, wherein determining whether the mobile device has moved between the first time and the second time comprises:
determining whether the first accuracy indicator of the current location data intersects with the second accuracy indicator of the obtained location data.

17. The machine-readable medium of claim 16, wherein the first accuracy indicator comprises a first circle with a first radius centered around first coordinates of the current location data associated with the first source and the second accuracy indicator comprises a second circle with a second radius centered around second coordinates of the location data from the second source.

18. The machine-readable medium of claim 15, wherein the operations further comprise:
persisting the current location data of the mobile device if the second source is less accurate than the first source.

19. A method for determining a location of a mobile device from different sources of location data, the method comprising:
obtaining, with one or more computing devices, current location data of a mobile device, wherein the current location data is associated with a first source of location data, a first time, and a first accuracy indicator for the first source of location data;
storing, with the one or more computing devices, the current location data associated with the first source;
obtaining, with the one or more computing devices, location data from a second source of location data, wherein the location data from the second source is associated with a second accuracy indicator for the second source of location data and a second time;
determining, with the one or more computing devices, whether the mobile device has moved from the first time to the second time based at least in part on the first accuracy indicator and the second accuracy indicator;
determining, with the one or more computing devices, whether the location data from the second source of location data is more accurate than the current location data associated with the first source based at least in part on the first accuracy indicator and the second accuracy indicator; and
updating, with the one or more computing devices, the current location data of the mobile device with the obtained location data from the second source if the mobile device has moved from the first time to the second time and if the location data from the second source of location data is not less accurate than the current location data associated with the first source.

20. The method of claim 19, wherein the first accuracy indicator comprises a first circle with a first predetermined radius centered around first coordinates of the current location data associated with the first source and the second accuracy indicator comprises a second circle with a second predetermined radius centered around second coordinates of the location data from the second source.

21. The method of claim 20, further comprising persisting the current location data of the mobile device if the first predetermined radius is smaller than the second predetermined radius.

22. A system for determining a location of a mobile device from different sources of location data, the system comprising:
one or more processors; and
a machine-readable medium comprising instructions stored therein, which when executed by the one or more processors, cause the one or more processors to perform operations comprising:
storing current location data of a mobile device, wherein the current location data is associated with a first source of location data, a first accuracy indicator for the first source of location data, and a first time;
obtaining location data from a second source of location data, wherein the location data from the second source is associated with a second accuracy indicator for the second source of location data and a second time;
determining whether the mobile device has moved from the first time to the second time based at least in part on whether the first accuracy indicator overlaps with the second accuracy indicator;
determining whether the location data from the second source of location data is less accurate than the current location data associated with the first source based at least in part on the first accuracy indicator and the second accuracy indicator; and
updating the current location data of the mobile device with the obtained location data from the second source if the mobile device has moved from the first time to the second time or if the location data from the second source of location data is not less accurate than the current location data associated with the first source.

23. The system of claim 22, wherein the first accuracy indicator comprises a first circle and the second accuracy indicator comprises a second circle, and wherein determining whether the mobile device has moved from the first time to the second time based at least in part on whether the first accuracy indicator overlaps with the second accuracy indicator comprises:
determining whether the first circle overlaps with the second circle.

24. The system of claim 22, wherein updating the current location data of the mobile device with the obtained location data from the second source comprises:
updating a timestamp associated with the current location data if it is determined that the mobile device has not moved from the first time to the second time and that the location data from the second source is less accurate than the current location data associated with the first source, wherein the updated timestamp is indicative of the second time.

25. A non-transitory machine-readable medium comprising instructions stored therein, which when executed by a machine, cause the machine to perform operations comprising:
obtaining current location data of a mobile device, wherein the current location data is associated with a first source of location data, a first time, and a first accuracy indicator for the first source of location data, wherein the first accuracy indicator comprises a first circle with a first radius;
storing the current location data associated with the first source;
obtaining location data from a second source of location data, wherein the location data from the second source is associated with a second time and a second accuracy indicator for the second source of location data, wherein the second accuracy indicator comprises a second circle with a second radius;

determining whether the mobile device has moved from the first time to the second time based at least in part on whether the first circle overlaps with the second circle;

determining whether the location data from the second source of location data is less accurate than the current location data associated with the first source based at least in part on the first radius and the second radius; and updating the current location data of the mobile device with the obtained location data from the second source if the mobile device has moved from the first time to the second time or if the location data from the second source of location data is not less accurate than the current location data associated with the first source.

* * * * *